United States Patent Office 3,505,374

Patented Apr. 7, 1970

3,505,374
GELLING AGENTS FOR HYDROCARBONS

Roger F. Monroe, Midland, Mich., assignor to The Dow Chemical Company, Midland, Mich., a corporation of Delaware No Drawing. Filed Jan. 30, 1968, Ser. No. 701,560
Int. Cl. C07f 15/02
U.S. Cl. 260—439 2 Claims

ABSTRACT OF THE DISCLOSURE

Novel ferroso-ferric (magnetite) salts of certain dialkyl orthophosphate mono acids have been discovered to be highly efficient gelling agents for hydrocarbons and halogenated hydrocarbon liquids. The gelation can be reversed by the addition of oil-soluble amines and amides.

THE SPECIFICATION

Gelled hydrocarbons and halohydrocarbons of the physical nature contemplated herein have many applications. Among these are suspending media for biologically active agents. Such thickened dispersions are well adapted for aerial spray application with minimal spray drift. The gelling agents may also be used to thicken hydrocarbons employed for fracturing subterranean oil-bearing formations. The thickened halohydrocarbons are of particular interest for specialized cleaning operations whereby the surfaces to be cleaned are coated with the halogenated solvent.

For the above purposes, it is desirable to provide novel gelling agents, especially materials in which the gelling effect can be reversed. Particularly desirable are new gelling agents for halogenated hydrocarbons.

In contemplation of the foregoing desiderata of the art, the instant invention provides a novel gelling agent characterized as a ferroso-ferric salt (magnetite) salt of an alkyl oleyl diester of orthophosphoric mono acid. The alkyl group may contain from 1 to 8 carbons. A curious aspect of the instant invention is the uniqueness of magnetic oxidized iron ($Fe_3O_4$) among the various oxidized forms of iron as a gelling salt species of the described diester phosphate mono acid.

As used herein, the terminology "gel" or "gelation" is to be distinguished from thickened solutions in which the viscosity is simply increased as a function of the concentration of dissolved solute. More specifically, the "gel" consistency will not disappear on dilution of the solution. With sufficient dilution, the solvent swollen gelling agent will appear as distinct phase in suspension. Moreover, the gel structure is temperature sensitive in that it will break down by heating to a relatively definite temperature and reform upon cooling. The gel structure of interest herein is further characterized by its sensitivity to the presence of oil-soluble amines or amides which reverse the gelation phenomenon.

Liquid hydrocarbons which can be gelled with the ester phosphate salts of the instant invention include aliphatic and aromatic hydrocarbons individually and in mixtures. Exemplary of such materials are heptane, octane, nonane, decane, benzene, toluene, ethyl benzene, gasoline, kerosene, lubricating oils and the like petroleum fractions. Halogenated hydrocarbons efficiently thickened by the novel gelling agents of the instant invention include methylene chloride, chloroform, carbon tetrachloride, methylchloroform, perchloroethylene, propylene dichloride, methylene bromide, ethylene dibromide, butyl bromide, allyl chloride and propargyl bromide or chloride.

Some gelation of such liquids will be achieved with as little as about 0.1 percent by weight of the additive based on the total weight of liquid to be thickened. Amounts up to 50 percent by weight may be used if desired. It is to be understood, of course, that smaller or greater amounts may be employed depending upon the desired consistency of the liquid to be gelled.

It is contemplated that the thickened hydrocarbons and the halogenated hydrocarbons may contain other ingredients as may be desired to achieve special effects. As previously mentioned, the hydrocarbon or halogenated hydrocarbon may function as a suspending agent for a biologically active ingredient, in which event gelation may be for the purpose of aerial spray application. When used in well fracturing operations, the hydrocarbons often may carry dispersions of solid particles known as propping agents. In addition, it is known to add antioxidants, corrosion inhibitors, foam suppressants, sludge inhibitors and various other ingredients for special effects when the hydrocarbon or halogenated hydrocarbon is employed for the purposes of lubrication and/or cleaning metal surfaces.

The ferroso-ferric salts of the diester phosphoric mono acids described herein may be prepared prior to incorporation into the liquid to be thickened, or they can be formed in situ. For instance, the ferroso-ferric salts are obtained by contacting the mono acidic form of the phosphate diester in an inert reaction medium with magnetite and mildly heating the resulting mixture, e.g. at a temperature within the range from about 40 to about 130° C. The diester phosphate salt is recovered from the reaction system by precipitation with an appropriate solvent such as acetone, methyl ethyl ketone, methanol, ethanol or propanol. The products recovered are essentially amorphous, rubber like solids, generally black in color.

Alternately, the ferroso-ferric alkyl oleyl phosphate can be prepared in situ by mutually contacting magnetite with the diester phosphate mono acid in the medium to be thickened and heating the same to an elevated temperature at which salt formation is efficiently promoted. Heating may be omitted if desired, in which event gelation, which follows salt formation, will require longer reaction times. Procedures for preparing the alkyl oleyl phosphate mono acid starting materials are well known to the art. Reference may be taken in this respect to U.S. Patents 2,983,678 and 2,983,679.

A gelled hydrocarbon or halohydrocarbon composition thus prepared is readily reduced to liquid form by incorporating into the gel a small amount of an oil-soluble amine or amide. Amines suitable for this purpose include ethanolamine, propanolamine, piperazine, picoline, ethylenediamine, diethylenetriamine and the various higher polyamines which are at least partially soluble in oil.

The following specific example will serve to further illustrate the unique diester phosphate salts described herein and their use for thickening hydrocarbons and halohydrocarbons.

EXAMPLE

To 300 grams of kerosene contained in a beaker equipped with a mechanical stirrer were added 4 grams of $Fe_3O_4$ (ferroso-ferric oxide) and 19 grams of ethyl oleyl o-phosphoric acid. The mixture was rapidly stirred and heated at a temperature of about 120° C. When the temperature of the mixture had increased to about 83° C., the reaction system began to thicken. Heating was continued for another 30 minutes. Upon cooling, the reaction system formed a black rubbery gel which would flow slowly to conform to the shape of its container.

The addition of a small amount of ethylenediamine, e.g. from about 0.1 to 0.5 percent by weight, based on the weight of the reaction mass, reversed the gelation effect to produce a solution recovering essentially the viscosity of kerosene.

For the purposes of comparison, similar formulations were prepared employing in place of the $Fe_3O_4$ other oxidized forms of iron including ferrous and ferric oxides and hydroxides, chlorides, sulfates and nitrates. None of these oxidized forms of iron yielded a gel as obtained with the magnetic $Fe_3O_4$ (magnetite).

In further evaluations of the aforedescribed ferric ferroso ethyl oleyl orthophosphate it was found that one percent by weight concentrations of the complex in kerosene would pour, and at 4 percent conentration, the kerosene was converted to a shape retaining solid.

Particularly efficient paint removing compositions are formulated from halogenated solvents such as methylene chloride, 1,1,1-trichloroethane or perchloroethylene and a small amount of the diester phosphate salt. Approximately 1 percent by weight concentration of the novel salt thickens the halogenated solvent for convenient application to a painted surface in sufficient depth to completely loosen the paint. Removal of the solvent loosened paint film can be achieved with a dilute wash of an amine or amide, e.g. ethanolamine or a surfactant amide obtained as the reaction product of ethanolamine and a fatty acid.

What is claimed is:
1. Ferroso-ferric alkyl oleyl orthophosphate wherein the alkyl group has from 1 to 8 carbon atoms.
2. Ferroso-ferric ethyl oleyl orthophosphate.

References Cited

UNITED STATES PATENTS 2,983,679  5/1961  Pellegrini et al. _____ 252—325

TOBIAS E. LEVOW, Primary Examiner

A. P. DEMERS, Assistant Examiner

U.S. Cl. X.R.

44—7; 134—38; 252—8.55, 32.5, 75